US006035040A

United States Patent [19]

Mann et al.

[11] Patent Number: 6,035,040

[45] Date of Patent: Mar. 7, 2000

[54] SYSTEM AND METHOD FOR DECRYPTION IN THE SYMBOL DOMAIN

[75] Inventors: Karl D. Mann; Yan Hui, both of Nepean, Canada

[73] Assignee: Nortel Networks Corporation

[21] Appl. No.: 08/953,763

[22] Filed: Oct. 17, 1997

[51] Int. Cl.[7] ................................ H04L 9/18; H04L 9/28

[52] U.S. Cl. ................................................ 380/28; 380/49

[58] Field of Search ........................ 380/28, 49; 455/410, 455/411

[56] References Cited

U.S. PATENT DOCUMENTS

| | | | |
|---|---|---|---|
| 4,052,557 | 10/1977 | Chiu et al. | 178/67 |
| 5,375,140 | 12/1994 | Bustamante et al. | 375/1 |
| 5,699,434 | 12/1997 | Hogan | 380/49 |
| 5,828,754 | 10/1998 | Hogan | 380/0 |

*Primary Examiner*—Tod R. Swann
*Assistant Examiner*—Steve Kabakoff
*Attorney, Agent, or Firm*—Pascal & Associates

[57] ABSTRACT

A method of decrypting data comprising encrypting bit-wise data, using a first plural bit mask, modulating the data into symbol format, and transmitting the symbol format data to a receiving apparatus, in a receiving apparatus, rotating a current received symbol sample by an amount equal to one of (i) its difference in phase from an immediately preceding received symbol sample toward the phase of the immediately preceding received symbol sample phase, and (ii) by an amount equal to estimated carrier phase towards zero phase, generating a second bit mask subset derived from values of the first bit mask, comprising plural bits for each symbol, reflecting the rotated symbol by a phase defined by the plural bits to form a symbol which is devoid of encryption, and providing the symbol devoid of encryption to a soft-decision decoder.

11 Claims, 4 Drawing Sheets

SYSTEM AND METHOD FOR DECRYPTION IN THE SYMBOL DOMAIN

FIELD OF THE INVENTION

This invention relates to a system and a method for decryption of an encrypted stream of data carrying any of voice, data and signaling messages in communication systems.

BACKGROUND TO THE INVENTION

Encryption in wireless services has become important in order to prevent cellular phone fraud, to enhance electronic commerce and to support personal privacy. Standards for mobile telephony have been established to include the requirement of voice ciphering for voice privacy as well as signaling message and data encryption, for example in CDMA (IS-95), GSM, (ETSI GSM 03.20 and GSM 03.21) and TDMA standard IS-136(2).

Various methods have been proposed to achieve the requirement of these standards. However, the various key and mask generation proposals for achieving the voice ciphering and message/data encryption are different from each other. All, so far, however utilize applying a mask bit stream to the information bit stream via an exclusive-OR (XOR) operation.

The standard IS-136 REV A includes a figure as shown in FIG. 1. A speech encoder 1 outputs 77 class-1 and 82 class-2 bits. The 12 most perceptually significant bits of the class-1 bits are applied to a 7 bit cyclic redundancy count (CRC) computation process 3 for determination of a value to be used in the receiver for error detection. The 77 class-1 bits and the 7 CRC bits, as well as 5 tail bits are applied to a rate ½ convolutional coder 5 for channel encoding, producing 178 coded class-1 bits. Those coded class-1 bits and the 82 class-2 bits are applied to a voice cipher circuit 7, which produces a 260 bit bit-stream. After passing through a 2-slot interweaver 9, the signal is applied to a modulator for transmission (not shown).

It should be noted that the voice ciphering is performed after rate ½ convolutional coding of the speech signal, and before modulation. Encryption is performed in the voice cipher circuit 7 by applying a mask to the voice bit stream via an XOR operation, bit by bit. By the term "circuit" herein is meant either or both of hardware and process, which may include software.

After transmission of the encrypted signal via e.g. a wireless medium, it is received by a receiver. In the receiver, a system which processes the signal in a manner opposite to the system shown in FIG. 1 is used. It should be noted that the received signal is demodulated, deciphered, and then channel decoded before being sent to a speech decoder. The information sequence is represented as bits (referred to below as bit-wise operation) before being deciphered because the XOR operation and the mask bit stream is required to be used. Thus, bit-wise operation is used before modulation in the transmitter and right after demodulation in the receiver. This is a major roadblock preventing soft-decision decoding from being used for this application, for the following reasons.

FIG. 2 illustrates the encryption and decryption technique in the prior art system in more detail. A data bit stream is received by a channel encoder 11, and the stream of encoded data bits is applied to an XOR circuit 13 with a mask bit stream. The resulting encrypted data bit stream is applied to a modulator 15 (assumed herein to include a transmitter) to a wireless medium 17.

The signal is received and demodulated in a demodulator 19 of a receiver, which applies the encrypted bit stream to a decryption circuit 21, typically comprised of an XOR circuit, with a corresponding mask bit stream as was used in the encryption circuit. The resulting decrypted signal is applied to a hard decision decoder 23, from which a decoded bit stream is provided as an output signal.

In general, channel decoding can be performed in either of two ways, namely hard decision decoding and soft decision decoding. Usually analog samples output from the demodulator can be quantized and then decoding is performed digitally. In the extreme case in which each sample corresponding to a single bit of a code word is quantized to two levels, i.e. 0 or 1, the demodulator is said to make a hard decision and the channel decoder that works with this kind of input is said to perform hard decision decoding.

On the other hand, if the quantization is more than two levels, the resulting quantized samples are called soft symbols, or simply, symbols. The channel decoder that makes use of the information as soft symbols is said to perform soft decision decoding.

Hard decision decoding has the advantage of less computational complexity due to the bit-wise operation. However, for the same reason some useful information is lost during quantization and therefore it does not perform very well under certain circumstances, for example, in a noisy channel. However, noisy channels are common in real wireless communication systems.

Soft decision decoding (SDD) offers significantly better performance than hard decision decoding. For example, it has been reported that to achieve the same error probability, at least 2 dB more signal power must be generated at the transmitter when the demodulator uses a hard decision output (assuming the channel is an Additive White Gaussian Noise (AWGN) channel). Put another way, there is at least a 2 dB improvement for soft decision decoding in an AWGN channel. This improvement implies an increment in the capacity of a wireless cellular system, which is one of the most important issues in the wireless industry.

It is therefore desirable to provide SDD in the receiver. This requires the input to the soft decision decoder to be symbols instead of bits. The demodulator must therefore make a soft decision to output symbols. As a result, the input and output of an encryption process must be in symbol format. However, all of the current encryption schemes are based on bit-wise XOR masking operations. This makes SDD and XOR-based encryption very difficult, if not impossible, and apparently incompatible.

SUMMARY OF THE INVENTION

The present invention is a method and apparatus for allowing the bit-wise XOR masking encryption technique to be used in the transmitter, and yet providing decryption and SDD to be used in the receiver, thus achieving the reduced error probability and resulting increased capacity in a system such as a wireless system.

Briefly, in accordance with the invention the currently used bit-wise mask and XOR processed data generated in the transmission apparatus is mapped into the symbol domain in the receiver. This not only makes SDD possible while meeting the standard IS-136, but also provides a general technique that can map the XOR-based data operation into the symbol domain when phase-shift keying (PSK) is used for modulation. Thus the invention can be used in other communication systems.

A symbol reflection technique is used, wherein instead of using the entire bit mask used for encryption, the appropriate number of bits from the mask are used for each symbol (i.e. n bits each time for $2^n$ PSK) to make a decision on how the symbol should be reflected in the decryption apparatus. By doing so, deciphering is performed in the symbol domain. Since this is a linear operation in the symbol domain, the method does not destroy or reduce the information embedded in soft symbols. The output in symbol format is fed into a soft symbol decoder.

The method is suitable for both coherent and non-coherent demodulation.

In accordance with an embodiment of the present invention, a method of processing data is comprised of mapping binary domain bit inversion used to encrypt the data in an encryption apparatus, into symbol reflection in a symbol domain in a decryption apparatus, and providing resulting decrypted symbols to a soft-decision decoder.

In accordance with another embodiment of the invention, a method of decrypting data is comprised of encrypting bit-wise data, using a first bit mask, modulating the encrypted data into symbol format, and transmitting the symbol format data to a receiving apparatus; in a receiving apparatus, rotating a current received symbol sample by an amount equal to its difference in phase from an immediately preceding received symbol sample toward the phase of the immediately preceding received symbol sample phase, generating a second bit mask subset derived from values of the first bit mask, comprising plural bits for each symbol, reflecting the rotated symbol by a phase defined by the plural bits to form a symbol which is devoid of encryption, and providing the symbol devoid of encryption to a soft-decision decoder.

In accordance with another embodiment a system for transmission of at least one of voice, data and message data signals is comprised of a channel encoder for receiving and encoding a sequence of input data bits, an encryption apparatus for receiving and encrypting the encoded sequence of data bits using a single or multi-bit mask, a modulator for modulating the encrypted data bits into symbol format and for passing the modulated signal bits to a transmitter, a demodulator for receiving and demodulating the transmitted modulated signal into encrypted symbols, a symbol rotation apparatus for varying the phase of each of the symbols to the phase of a preceding symbol, a decryption apparatus for applying a predetermined number of bits of the single or multi-bit mask to the phase varied symbol and for reflecting the phase varied symbol by a phase defined by the predetermined number of bits, to provide a decrypted symbol, and a soft decision decoder for receiving and decoding the decrypted symbol.

BRIEF DESCRIPTION OF THE DRAWINGS

A better understanding of the invention will be obtained by a consideration of the detailed description below, in conjunction with the following drawings, in which.

DETAILED DESCRIPTION OF EMBODIMENTS OF THE INVENTION

Figure 1:
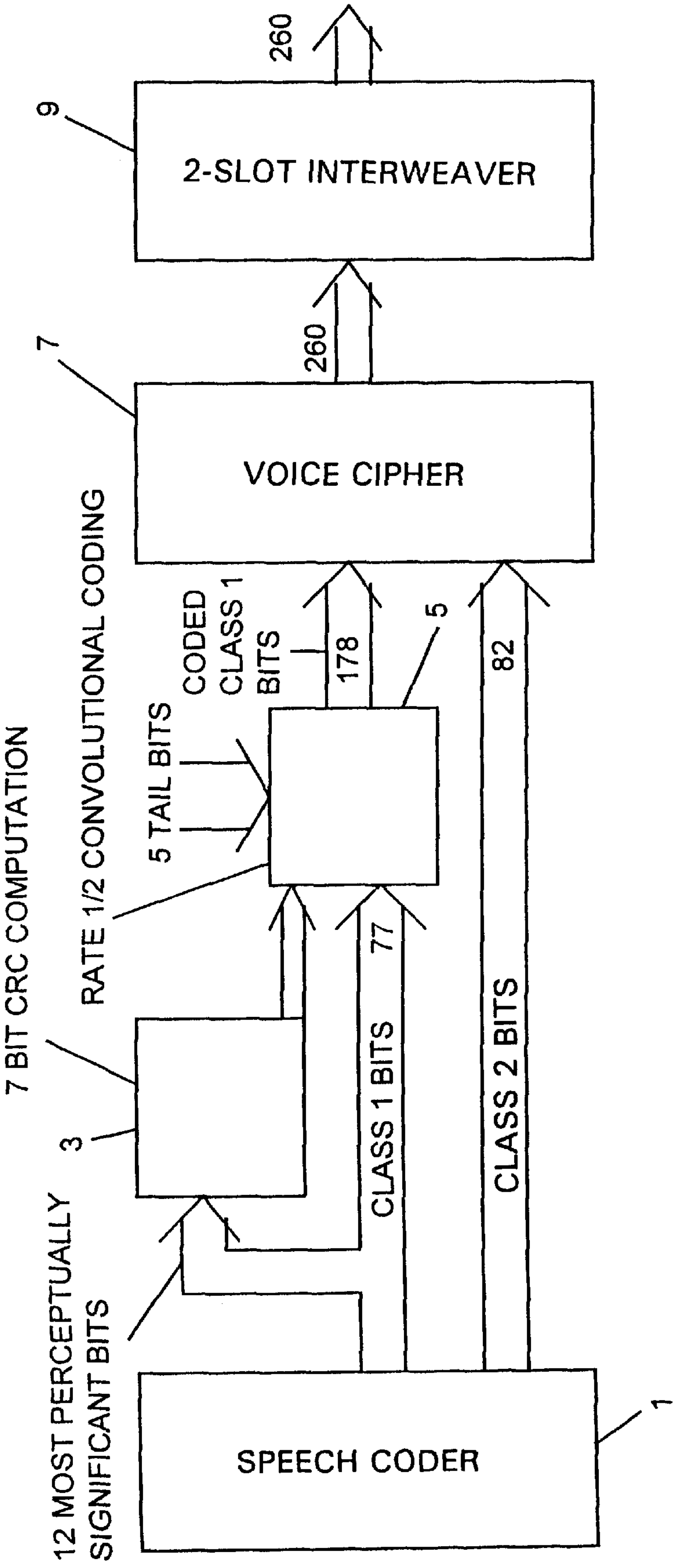
Prior Art Fig. 1
FIG. 1 is a block diagram of a system used in the prior art.
Figure 2:
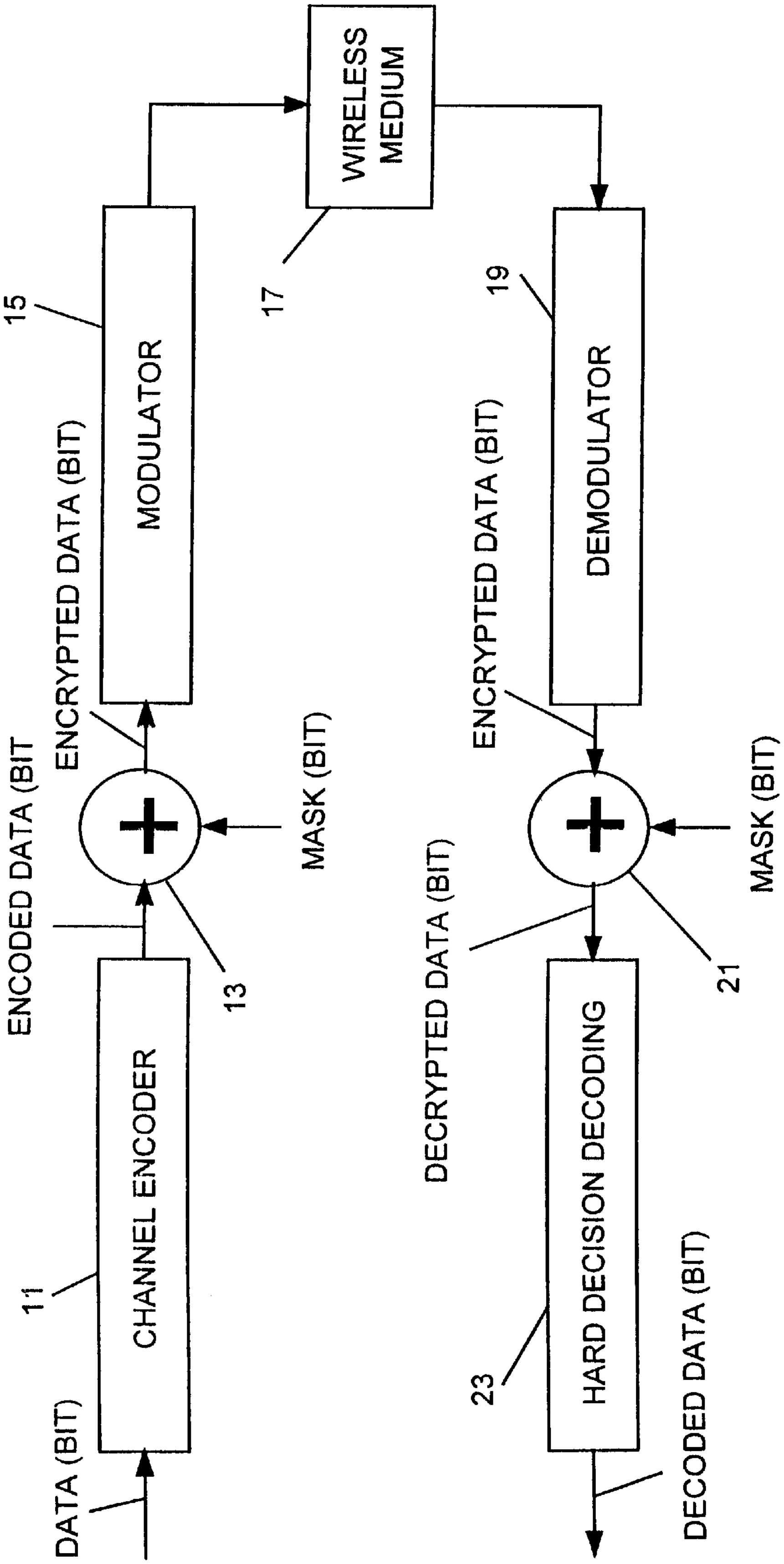
Prior Art Fig. 2
FIG. 2 is a block diagram of details of the system of FIG. 1.
Figure 3:
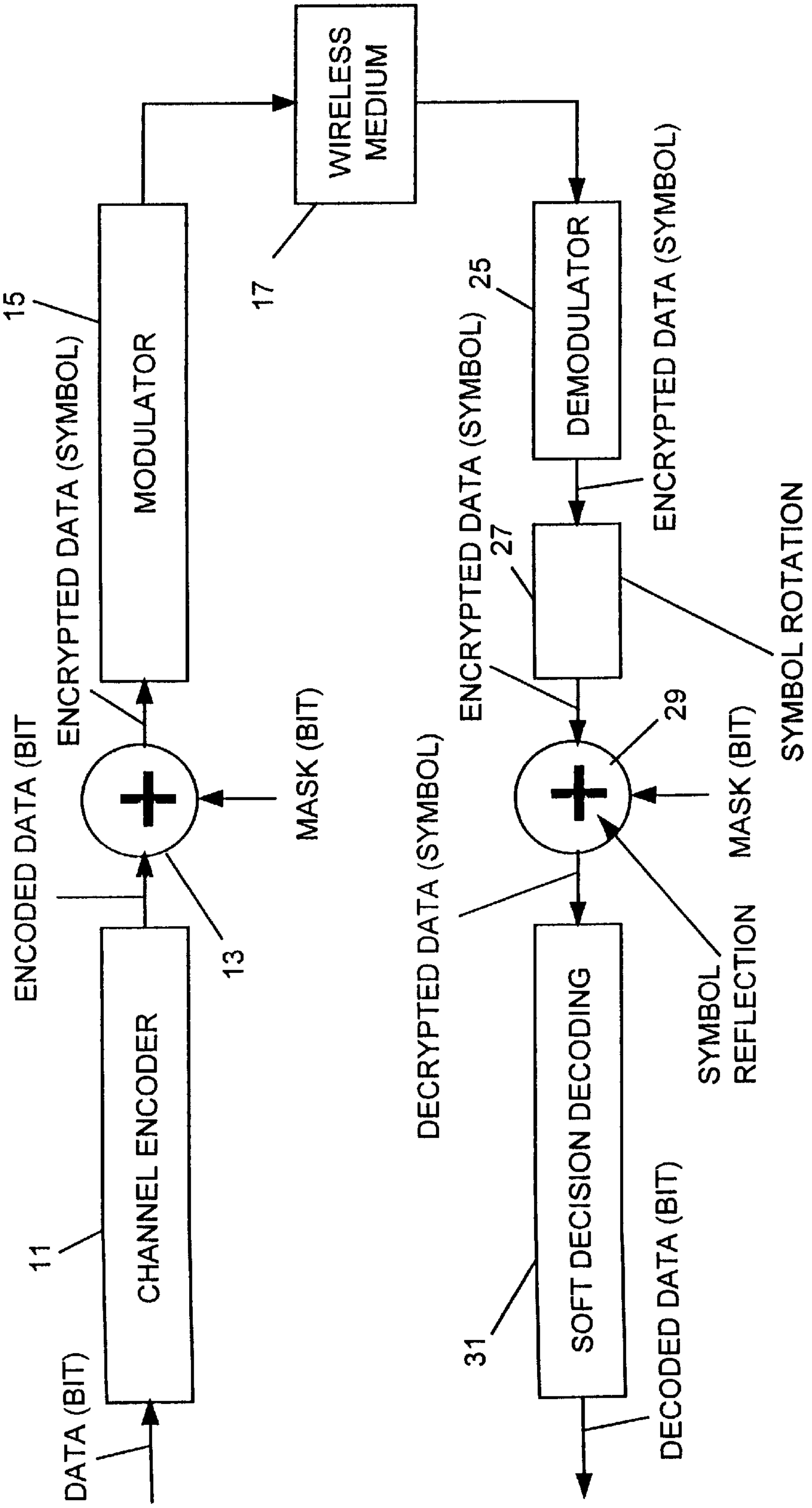
FIG. 3 is a block diagram of a system in accordance with an embodiment of the present invention.

Turning to FIG. 3, the apparatus and method for channel encoding, encrypting and modulating the encrypted signal is shown. The apparatus is similar to that of the prior art as shown and described above with respect to FIG. 2. The modulated signal transmitted via the wireless medium 17 is received by a demodulator 25 which demodulates the signal into data symbols.

For use of $2^n$ PSK for modulation, n bits at a time are used, changing the bit-wise data into symbol format.

In the receiving apparatus, after demodulation in demodulator 25, the data symbols are applied to a symbol rotation circuit or process 27, which changes the phase of each symbol to a degree as will be described below.

The rotated symbols are applied to a decryption circuit or process 29 where they are decrypted in soft symbols format, using a process which uses the same mask bits used in the encryption structure to control symbol reflection to respective phases controlled by the groups of mask bits.

The resulting decrypted soft symbols are applied to a soft decision decoder 31, which outputs decoded data in bit format.

More particularly, as an example of operation, assume that the system consists of a transmitter with the encryption mask being applied (XORed) to the data bit stream after convolutional encoding and before π/4 QPSK modulation. The mask bit X and Y values, relative to the most recent symbol, are indicated in the table below:

| MASK | | Symbol Reflection | | |
|---|---|---|---|---|
| X | Y | Axis | Fy | Fx |
| 1 | 1 | Both X & Y | −1 | −1 |
| 0 | 1 | Y axis | −1 | +1 |
| 0 | 0 | No reflection | +1 | +1 |
| 1 | 0 | X axis | +1 | −1 |

where $F_{x+}$ and $F_y$ represent variables in the equation $$S_n''=F_xRe(s_n')+iF_yIm(s_n')$$

where $S_n''$ represents the reflected symbol,

Re and Im represent real and imaginary components, and $s_n'=s_ne^{-j\theta_{pre}}$, (non-coherent modulation case) or $s_n'=s_ne^{-j\theta_{c\_est}}$ (coherent modulation case)

where $S_n$ represents the current symbol sample, $\theta_{pre}$ represents the phase angle of the previous symbol sample relative to an x axis, and $\theta_{c\_est}$ represents the estimated carrier phase.

The symbol reflection is applied based on the deciphering mask after rotation relative to a reference. By doing so, the soft symbols become decrypted in the symbol domain. This makes soft-decision channel decoding possible.

Symbol reflection in the receiving apparatus for non-coherent detection is effected using the following steps.

Figure 4:
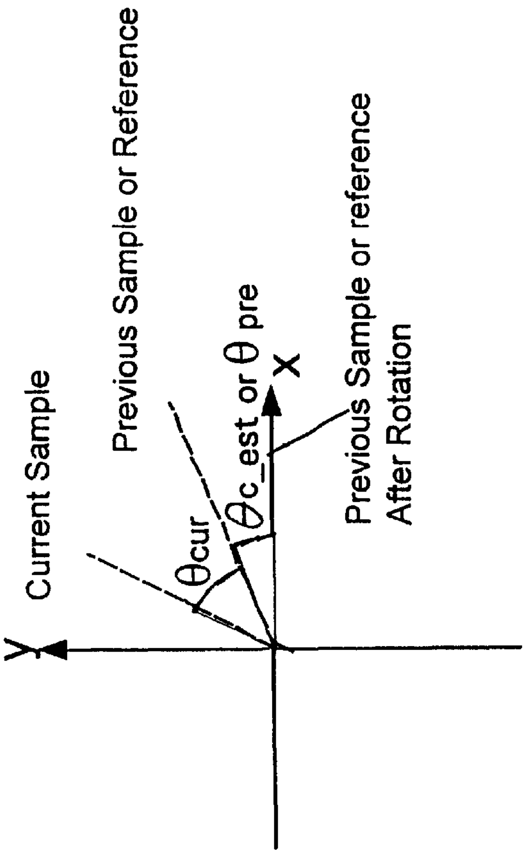
FIG. 4 is a phase diagram used to show the processing of signals in accordance with a general modulation scheme, in accordance with an embodiment of the present invention.

Reference is made to FIG. 4, which indicates the current and previous sample phases on a set of x and y axes representing sample in the real and imaginary domains:

(a) Estimate the phase $\theta_{pre}$ of the previous sample.

(b) Rotate the current observed sample by the angle of $\theta_{pre}$ towards the x-axis, i.e. make the previous sample the reference sample. This can be expressed as $$s_n' = s_n e^{-j\theta_{pre}}.$$

(c) Take n bits each time from the mask for $2^n$ PSK to form an n-bit mask subset.

(d) Using the predefined reflection rule, the symbol in the observation domain is reflected about the pre-defined axes according to the n-bit subset, i.e.

$$S_n'' = F_x Re(s_n') + iF_y Im(s_n')$$

using Fx and Fy listed in the table shown above. This deciphers the data in the symbol domain before decoding in the soft-decision decoder 31. The result is the symbol without encryption.

(e) Input the reflected symbols in the soft-decision decoder 31.

For coherent detection, $\theta_{c\_est}$ should be substituted for $\theta_{pre}$, where $\theta_{c\_est}$ is based on carrier tracking and the previous decision.

For binary PSK (BPSK), it becomes trivial to perform and the reflection (i.e. a sign change for the samples when the mask is 1 (a 1 bit mask) and no change if the mask is 0). For 4PSK, 2 bits are taken from the mask each time and the table shown above is used.

Figure 5:
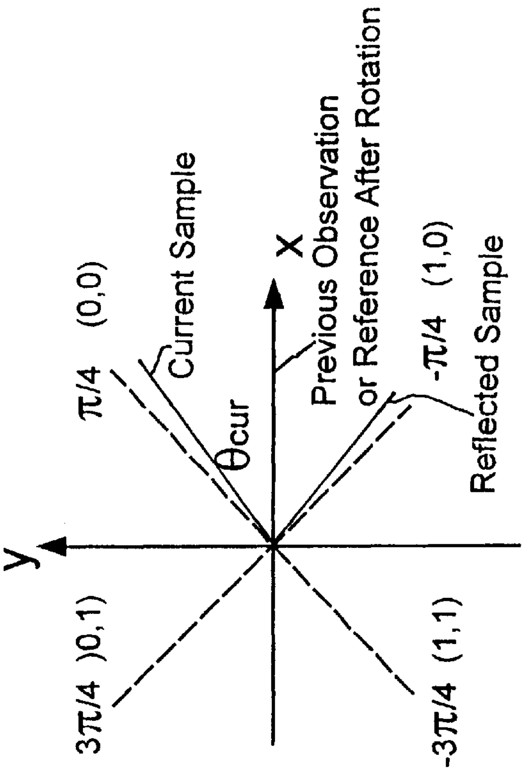
FIG. 5 is a phase diagram used to show the processing of signals in accordance with a π/4 DQPSK (Differential Quadrature PSK) modulation scheme, in accordance with an embodiment of the present invention.

FIG. 5 illustrates a phase diagram for π/4 DQPSK encryption. When the 2-bit mask subset is 1,0 for example, the current sample with phase $\theta_{cur}$ is reflected with respect to the x-axis (i.e. the previous sample or reference). A symbol with a phase near to π/4 becomes one near −π/4 instead.

Thus the symbol is reflected about the x-axis when the x-bit in the 2 bit mask subset is 1; the same is true for the y-bit.

The method also works for QAM (Quadrature Amplitude Modulation) and for QPSK modulation schemes of 2-bits per symbol.

For 8 DPSK, if Gray code is used, this method can achieve optimum results for four out of eight 3-bit mask combinations.

The invention can be implemented using different software and hardware configurations, and is not limited to the embodiments described in detail above. It can be applied to systems which do not conform to the IS-136 standard, such as wireless systems specified by the standards other than IS-136 and wire-line modems.

A person understanding this invention may now think of alternate embodiments and enhancements using the principles described herein. All such embodiments and enhancements are considered to be within the spirit and scope of this invention as defined in the claims appended hereto.

We claim:

1. A method of decrypting data comprising:

(a) encrypting bit-wise data, using a first bit mask, modulating the data into symbol format, and transmitting the symbol format data to a receiving apparatus, in a receiving apparatus, (b) rotating a current received symbol sample by an amount equal to one of (i) its difference in phase from an immediately preceding received symbol sample toward the phase of the immediately preceding received symbol sample phase, and (ii) by an amount equal to estimated carrier phase towards zero phase, (c) generating a second bit mask subset derived from values of the first bit mask, comprising plural bits for each symbol, (d) reflecting the rotated symbol by a phase defined by the plural bits to form a symbol which is devoid of encryption, and (e) providing the symbol devoid of encryption to a soft-decision decoder.

2. A method as defined in claim 1 in which the bit mask is comprised of two bits per symbol.

3. A method as defined in claim 1 in which the data is initially encrypted by XORing input data bits with a plural bit encryption mask after convolutional encoding and prior to modulation, and modulating and transmitting the encrypted symbol format data to a demodulator for carrying out step (b).

4. A method as defined in claim 3 in which a form of modulation is one of BPSK, π/4 DQPSK, 8 PSK, QAM and QPSK.

5. A method as defined in claim 3 in which a form of modulation is 4PSK and the symbol is reflected in accordance with the following truth table:

| MASK | | Symbol Reflection | | |
|---|---|---|---|---|
| X | Y | Axis | Fy | Fx |
| 1 | 1 | Both X & Y | −1 | −1 |
| 0 | 1 | Y axis | [+1] − 1 | [−1] + 1 |
| 0 | 0 | No reflection | +1 | +1 |
| 1 | 0 | X axis | [−1] + 1 | [+1] − 1 |

Where $F_x$ and $F_y$ represent variables in the equation $$S_n'' = F_x Re(s_n') + iF_y Im(s_n')$$

Where $S_n''$ represents the symbol,

Re and Im represent real and imaginary components, and $$s_n' = s_{ne}^{-j\theta_{pre}},$$

or $$s_n' = s_n e^{-j\theta pullout;zu646200.900}$$

where $S_n$ represents the current symbol sample, $\theta_{pre}$ represents the phase angle of the previous symbol sample relative to an x axis, and $\theta_{c\_est}$ represents the estimated carrier phase.

6. A method as defined in claim 1 in which the data is comprised of at least one of voice, data bits and messages.

7. A method as defined in claim 1 in which said bit mask is equal to n for each symbol, where the symbols prior to demodulation are in the format of $2^n$ PSK ($2^n$ phase shift keyed).

8. A method of processing data comprising mapping binary domain bit inversion used to encrypt said data in an encryption apparatus, into symbol reflection in a symbol domain in a decryption apparatus, and providing resulting decrypted symbols to a soft-decision decoder.

9. A system for transmission of at least one of voice, data and message data signals comprising:

(a) a channel encoder for receiving and encoding a sequence of input data bits, (b) an encryption apparatus for receiving and encrypting the encoded sequence of data bits using a single or multi-bit mask, (c) a modulator for modulating the encrypted data bits into symbol format and for passing the modulated signal bits to a transmitter, (d) a demodulator for receiving and demodulating the transmitted modulated signal into encrypted symbols, (e) a symbol rotation apparatus for varying the phase of each of the symbols to one of (i) the phase of a preceding symbol and (ii) an estimated carrier phase, (f) a decryption apparatus for applying a predetermined number of bits of said single or multi-bit mask to the phase varied symbol and for reflecting the phase varied symbol by a phase defined by the predetermined number of bits, to provide a decrypted symbol, and (g) a soft decision decoder for receiving and decoding the decrypted symbol.

10. A system as defined in claim 9 in which the predetermined number of bits applied to the decryption apparatus for each symbol is n, and in which the modulation is $2^n$ PSK.

11. A system as defined in claim 10 in which the modulation is 4PSK and the symbol is reflected in accordance with the following truth table:

| MASK | | Symbol Reflection | | |
|---|---|---|---|---|
| X | Y | Axis | Fy | Fx |
| 1 | 1 | Both X & Y | −1 | −1 |
| 0 | 1 | Y axis | −1[+1] | [−1] + 1 |
| 0 | 0 | No reflection | +1 | +1 |
| 1 | 0 | X axis | [−1] + 1 | [−1] − 1 |

where $F_x$ and $F_y$ represent variables in the equation $$S_n''=F_xRe(s_n')+iF_yIm(s_n')$$

where $S_n''$ represents the symbol,

Re and Im represent real and imaginary components, and $S_n'=s_ne^{-j\theta_{pre}}$, (non-coherent modulation case) or $s_n'=s_ne^{-j\theta_{c\_est}}$ (coherent modulation case)

where $S_n$ represents the current symbol sample and $\theta_{pre}$ represents the phase angle of the previous symbol sample relative to an x axis for a non-coherent demodulation case, and $\theta_{c\_est}$ represents an estimated carrier phase relative to zero phase for a coherent demodulation case.

* * * * *